United States Patent
Grundei

(10) Patent No.: US 6,814,193 B2
(45) Date of Patent: Nov. 9, 2004

(54) VIBRATION DAMPER WITH A HYDRAULIC PRESSURE STOP

(75) Inventor: Manfred Grundei, Niederwerrn (DE)

(73) Assignee: ZF Sachs AG, Schweinfurt (DE)

( * ) Notice: Subject to any disclaimer, the term of this patent is extended or adjusted under 35 U.S.C. 154(b) by 0 days.

(21) Appl. No.: 10/444,581

(22) Filed: May 23, 2003

(65) Prior Publication Data

US 2003/0234146 A1 Dec. 25, 2003

(30) Foreign Application Priority Data

May 24, 2002 (DE) .......................................... 102 22 940

(51) Int. Cl.[7] ................................................. F16F 9/34
(52) U.S. Cl. .............................. 188/322.15; 188/322.22
(58) Field of Search ............................ 267/289, 140.14, 267/64.11; 188/322.19, 282.1, 322.15, 322.22, 316, 269

(56) References Cited

U.S. PATENT DOCUMENTS

| | | | | |
|---|---|---|---|---|
| 2,729,308 A | * | 1/1956 | Koski et al. | 188/284 |
| 4,106,596 A | * | 8/1978 | Hausmann | 188/314 |
| 4,909,488 A | * | 3/1990 | Seibert et al. | 267/64.11 |
| 5,570,762 A | * | 11/1996 | Jentsch et al. | 188/322.15 |
| 5,810,128 A | * | 9/1998 | Eriksson et al. | 188/289 |
| 5,913,391 A | * | 6/1999 | Jeffries et al. | 188/317 |
| 6,234,461 B1 | * | 5/2001 | Bohm et al. | 267/64.12 |

FOREIGN PATENT DOCUMENTS

DE 198 29 765 A1 2/1999

* cited by examiner

*Primary Examiner*—Robert A. Siconolfi
*Assistant Examiner*—Melanie Torres
(74) *Attorney, Agent, or Firm*—Cohen, Pontani, Lieberman & Pavane

(57) ABSTRACT

A vibration damper with a hydraulic-mechanical pressure stop includes a cylinder filled with damping medium; a piston rod movable in and out of the cylinder, a first piston fixed to the piston rod with freedom of axial movement, a second piston spaced from the first piston, a transfer spring in the second working space for moving the second piston toward the third working space in response to movement of the first piston toward the second working space; and a disk valve which allows damping medium to flow from the third working space through the second piston to the second working space as the second piston moves toward the third working space. The first piston divides the cylinder into a first and a second working space where the piston rod extends through the first working space. The second piston separates the second working space from a third working space.

13 Claims, 3 Drawing Sheets

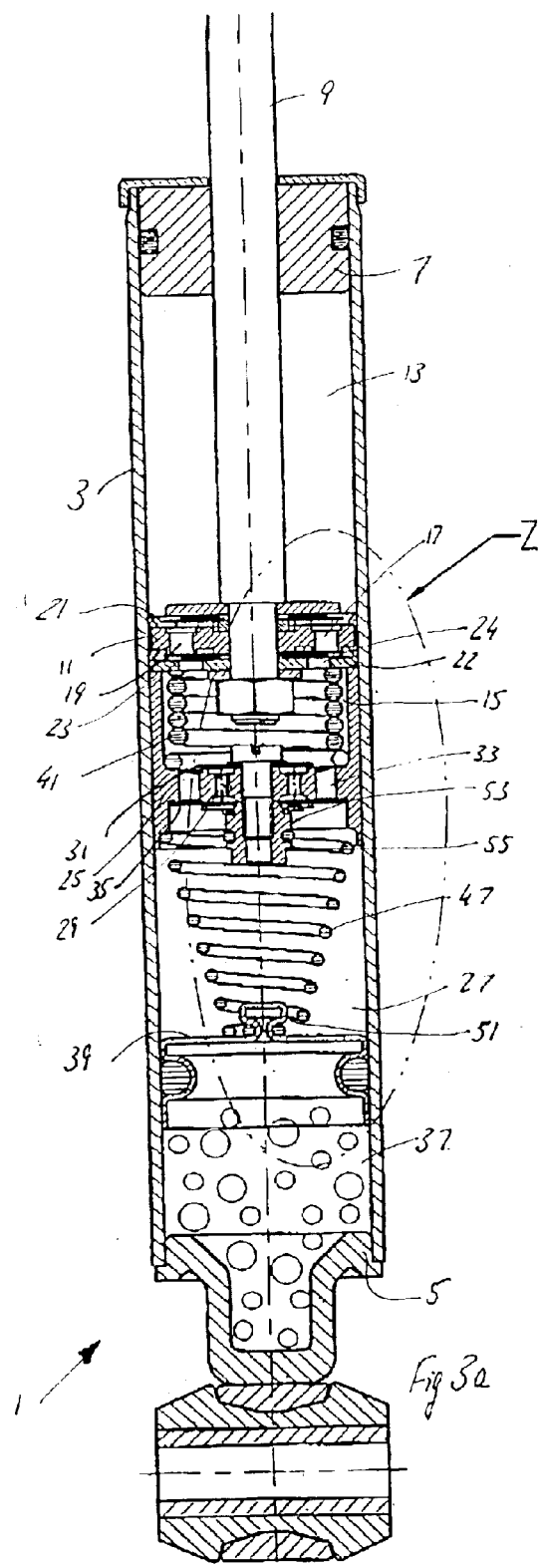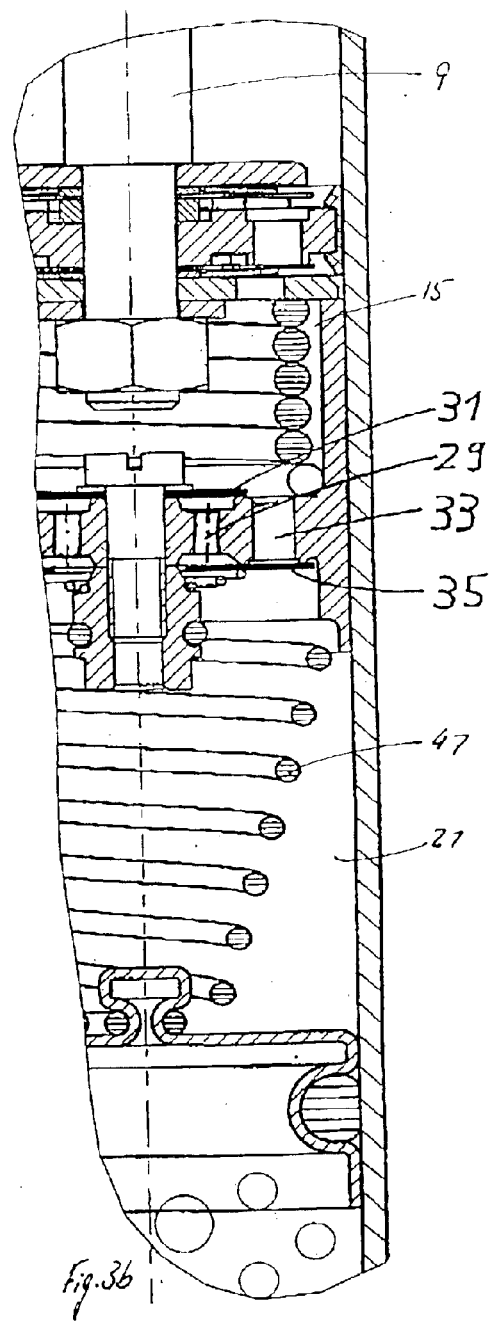

VIBRATION DAMPER WITH A HYDRAULIC PRESSURE STOP

BACKGROUND OF THE INVENTION

1. Field of the Invention

The invention relates to a vibration damper with a pressure stop where the vibration damper includes a cylinder filled with a damping medium in which a piston rod together with a first piston is installed with freedom of axial movement and where the piston divides the cylinder into first and second working spaces.

2. Description of the Related Art

A piston-cylinder assembly with a hydraulic-mechanical pressure stop is disclosed in known from DE 198 29 765 A1, which is hereby incorporated by reference in its entirety. Therein, a second piston is pushed by a rigid extension of the piston rod against a return spring as soon as the piston rod has traveled inward by a certain distance. The second piston is guided inside a pressure cylinder, which has a number of throttle connections leading to the adjacent working space and which is permanently supported on a valve body at the base of the vibration damper.

During a normal inward travel phase, only the throttle connections between the second piston and the base of the pressure cylinder produce the damping force. A disk valve inside the separating piston opens only when peaks in the damping force exceed a certain threshold. This type of pressure stop can be used effectively only in heavy trucks or other types of construction vehicles, in which an extreme pressure stop effect is to be achieved. As a matter of principle, the damping force characteristic of a pressure stop with a fixed throttle cross section is parabolic. This damping force characteristic, however, cannot be usefully adapted to a conventional passenger vehicle. That is, either both the damping force which occurs at low piston rod speeds and the maximum damping force in the desired range are too low, or the damping force is suitable at lower elastic travel speeds but much too high at faster piston speeds.

In applications in conventional passenger vehicles, furthermore, it is also disadvantageous that the point at which the hydraulic pressure stop goes into action can be easily detected. Entrance grooves maybe made in the second piston to provide a bypass over a certain part of the distance traveled by the separating piston, but the effectiveness of this measure is limited.

SUMMARY OF THE INVENTION

In present invention a hydraulic pressure stop provides a gentle transition between the range of normal travel distances and the range in which the pressure stop goes into effect. The pressure stop offers at least the possibility of a degressive damping force characteristic.

In the present invention, the movement of the piston rod acts by way of a transfer spring on the second piston, and in that all of the displaced damping medium is displaced from the third working space through the disk valve of the second piston into the second working space.

Because of the incorporation of the second piston into the design of a pure disk valve, the hydraulic pressure stop can be adapted very precisely to the requirements, especially to the requirements for a passenger vehicle, which requires comfortable damping behavior. The damping force of the first piston is sufficient over the range of displacement, i.e. stroke, distances traveled at small useful loads. The damping force of the second piston is added to that of the first piston only after a defined load state has been exceeded. It, therefore, becomes possible to adjust the damping force characteristic of the first piston more carefully to the requirements of comfort. The reason for this is that, because of the use of the disk valve, the second piston already provides a significant amount of initial damping even at relatively low flow rates without become too "hard" at high flow rates.

So that the damping force can be initiated smoothly, it is advisable for the elastic force of the transfer spring to be greater than the elastic force of the return spring, at least after the piston rod has traveled a defined distance after starting to transmit force to the second piston. Otherwise, in cases where the transfer spring is very soft, it is possible for the transfer spring to be compressed into a solid block before the second piston starts to move.

Advantageously, the vibration damper may have a separating piston, which separates a compensating space from the third working space. Therein, the return spring is supported on the separating piston. The second piston is supported in practice against the pressure in the compensating space, which can be generated by a gas cushion or by a pretensioning spring. This pressure is transmitted to the third working space.

So that the return spring can be held in a defined position even when the first piston is traveling outward, the separating piston is provided with a tensile force locking device for the return spring, so that the end of the return spring facing the separating piston always moves synchronously with the separating piston.

Thus, the tensile force locking device is advantageously formed by a mushroom-shaped part on the surface of the separating piston, which is gripped by a turn of the return spring.

The transfer spring remains connected in turn to the second piston regardless of the distance it travels. The separating piston, the return spring, and the transfer spring can be preassembled to form a unit independently of the other components of the vibration damper.

Many different materials can be used to fabricate the transfer spring. It can be effective, for example, for the transfer spring may be formed by an elastomeric body.

Especially when the transfer spring is very soft, it is effective for the second piston to have a guide sleeve for the transfer spring to ensure good radial guidance.

The second piston may also have a check valve, which opens in the direction of the third working space. This prevents the third working space from being unable to accept damping medium quickly enough at high rates of elastic travel.

As a further design feature, the disk valve and the check valve are clamped by a fastening means to the second piston, where the fastening means has an axial locking device for the return spring.

The first piston requires only a few adjustment measures, because the transfer spring is supported on a support plate for at least one valve disk of the first piston.

So that the support plate does not exert a negative effect on the desired damping force characteristic of the two pistons, the support plate is provided with a number of flow-through openings for a non-throttling connection between the second working space and the valves in the first piston.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings:

FIG. 3a is a partial cross-sectional view of the vibration damper in one operating position in accordance with one embodiment of the present invention.

FIG. 3b is a partial cross-sectional view of a detail of the vibration damper in accordance with one embodiment of the present invention.

DETAILED DESCRIPTION OF THE PRESENTLY PREFERRED EMBODIMENTS

Figure 1:
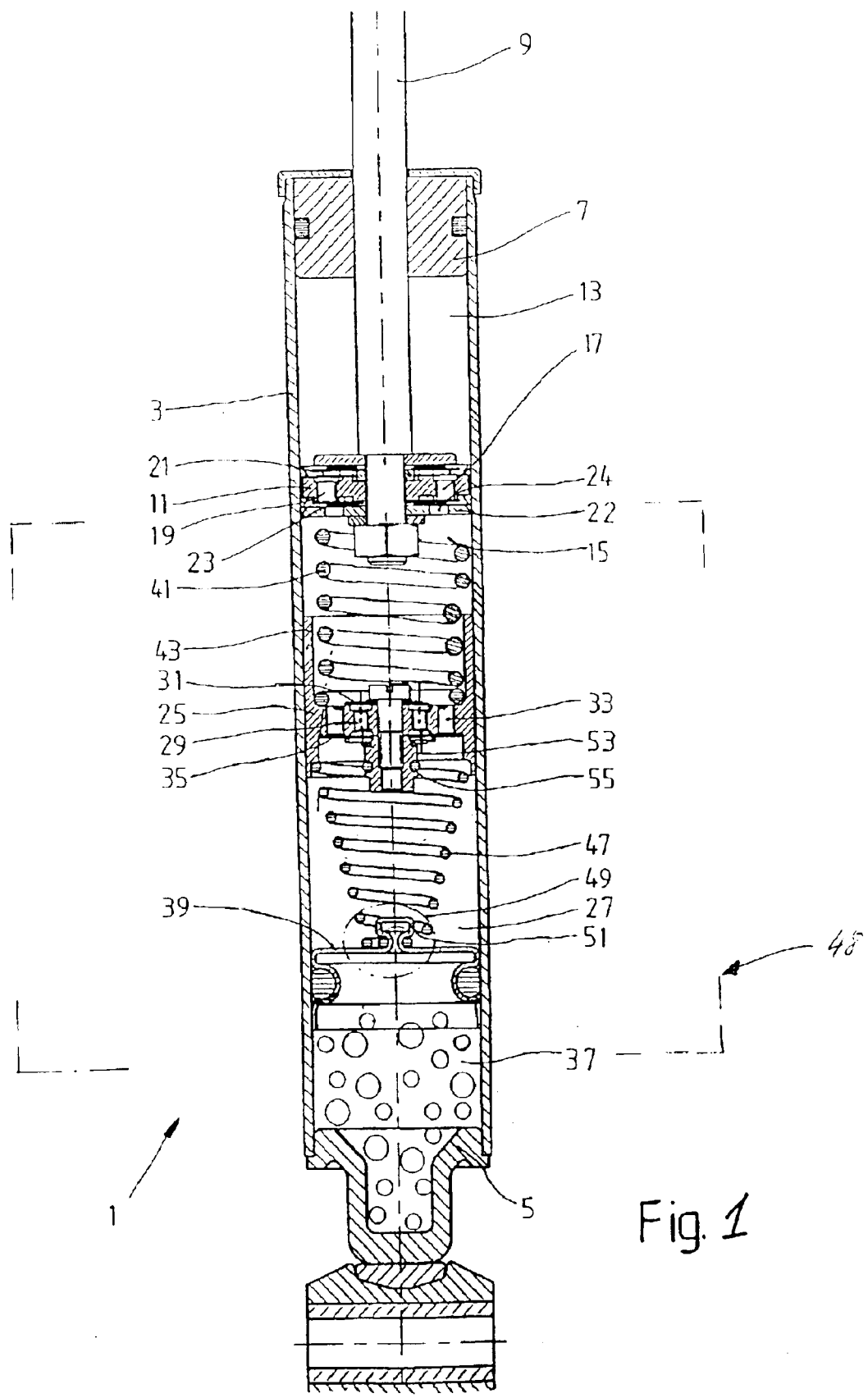
FIG. 1 is a partial cross-sectional view of the vibration damper according to one embodiment of the present invention.
Figure 2:
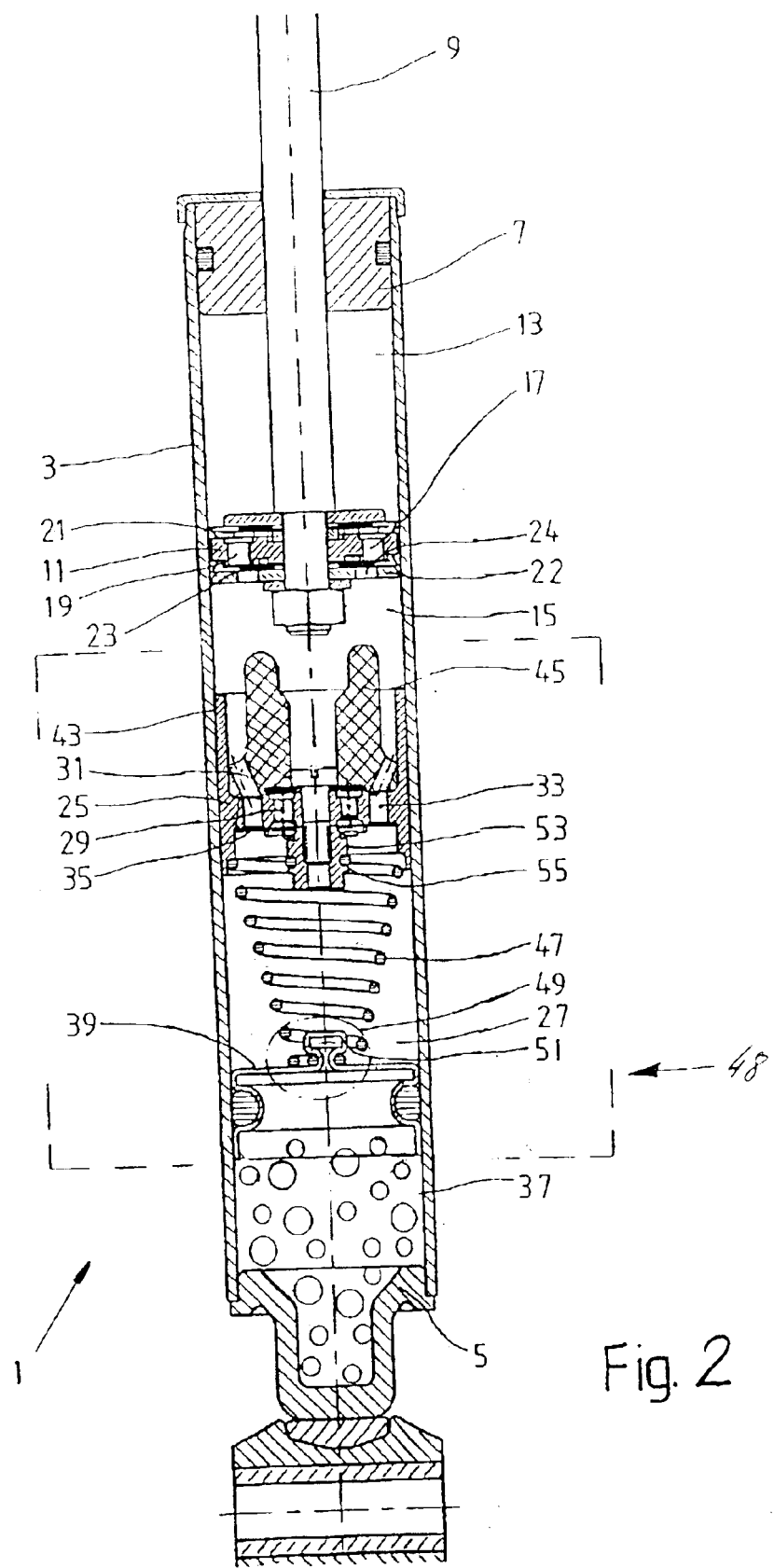
FIG. 2 is a partial cross-sectional view of the vibration damper according to one embodiment of the present invention.

In FIGS. 1 and 2, a vibration damper 1 is a single-tube design, which has a cylinder 3 and which is closed off at the ends by a base piece 5 and a piston rod guide 7. The piston rod guide 7 centers an axially movable piston rod 9, to which a first piston 11 is attached. The first piston 11 separates a cylinder 3, which is filled with damping medium, into a first working space 13 and a second working space 15. Flow connections 17, 19 are provided inside the first piston 11, the outlets of which are covered alternately by at least one valve disk 21, 23. A support plate 22, which has non-throttling flow-through openings 24, is assigned at least to the valve disk 23 facing the second working space 15. When the piston rod a moves, the flow connections 17, 19 together with the valve disks 21, 23 generate a damping force regardless of whether the piston rod 9 is traveling inward or outward.

Between the base 5 and the first piston 11, a second piston 25 is installed with freedom of axial movement. This second piston 25 is centered directly on the inside walls of the cylinder 3 and separates the second working space 15 from a third working space 27, which is also filled with damping medium. Inside the second piston 25, flow connections 29 are provided in accordance with the same design principle as that of the first piston 11. At least one valve disk 31 facing the first piston 11 is pretensioned over the outlets of the flow connections 29. Separate from these flow connections 29, at least one pressure-compensating connection 33 is provided as part of a check valve 35 that opens when the second piston 25 moves toward the first piston 11.

A compensating space 37 for the inward and outward-traveling piston rod volume is adjacent to the third working space 27. If desired, a gas cushion or a compression spring can be installed in the compensating space 37. A separating piston 39 is installed in the compensating space 37. As a result, the pressure prevailing at any moment in the third working space 27 us the same as that in the compensating space 37.

Above the second piston 25 is a transfer spring 41, which is held radially by a guide sleeve 43. The relaxed length of the transfer spring 41 is a function of the vehicle. In a predetermined normal position, there is generally no contact between the transfer spring 41 and the support plate 22 of the first piston 11. Only after the piston rod 9 has traveled a certain distance inward does the first piston 25 act by way of the transfer spring 41 on the second piston 25. The transfer spring can be a helical compression spring 41 as illustrated in FIG. 1, but it can also be an elastomeric body 45 as illustrated in FIG. 2, and it is always connected to the second piston 25 regardless of how far the second piston 25 travels. It is also possible, however, for the transfer spring to be connected permanently to, for example, the support plate 22 or to another component on the piston rod side.

A return spring 47 is installed between the second piston 25 and the separating piston 39. The second piston 25 and the return spring 47 form a hydraulic-mechanical pressure stop 48. In addition, the separating piston 39 has a tensile force locking device 49, which is formed by a mushroom-shaped part 51 on the surface of the separating 39 piston; a turn of the return spring 47 grips this shape 51. The other end of the return spring 47 acts on the second piston 25, where a fastening device 53 includes a screw which clamps the disk valve 31 to the second piston 25 and a threaded spool which clamps the check valve 35 to the second piston 25. The last turn of the return spring 47 engages positively with a groove in the circumference of the spool so that the spring 47 is axially locked to the piston 25.

When the piston rod 9 travels inward as illustrated in FIG. 3a, the movement acts on the transfer spring 41, 45 by way of the support plate 22 of the first piston 11 as soon as the piston rod 9 has traveled a certain defined distance. The transfer spring 41, 45 is supported in turn on the second piston 25, which is itself held by the return spring 47 and the pressure gradient which exists between the third and the second working spaces 27, 15. This force corresponds in turn to the force in the compensating space 37.

The coordination between the transfer spring 41, 45 jointly the transfer element, the disk valve 29, 31 of the second piston 25 (as illustrated in FIG. 3b showing detail Z of FIG. 3a), and the return spring 47 is essential to the action of the hydraulic-mechanical pressure stop 25, 47. It is effective for the elastic force of the transfer spring 41, 45 to be greater than the elastic force of the return spring 47 at least after the piston rod 9 has traveled a certain defined distance, because otherwise the transfer spring 41 would be compressed into a solid block, and after that the first and the second pistons 11, 25 would travel synchronously inward together.

The elastic force of the return spring 47, furthermore, may not be too weak in relation to that of the transfer spring 41, 45. In the case of high-frequency movements of the piston rod 9 during which the stroke is long enough to enter the range in which the vehicle is at the desired level, the effect could occur that, in spite of the use of the check valve 35, the second piston 25 is unable to follow the movement of the piston rod 9 in the outward direction. This means that the second piston 25 would be pushed inward together with the transfer spring 41 by a comparatively large distance in the direction of the separating piston 39, and thus the point at which the transfer spring 41 goes into action would be shifted toward the separating piston 39.

When the piston rod 9 is moving around the level point or in the outward direction, only the valve disks 23, which work together with the flow-through openings 17 in the first piston 11, are in action, as a result of which only a small damping force is produced, which is comfortable for the passengers. A more heavily loaded vehicle sinks farther down in the suspension, because of which the movement of the piston rod will now exert a certain force on the transfer spring 41, 45. Thus, the second piston 25 with its disk valve 29, 31 is activated so that the entire volume displaced from the third working space 27 flows through the disk valve 29, 31 into the second working space 15. The disk valve 29, 31 with its minimum of one valve disk may behave degressively, so that the increase in the damping force is only moderate at higher inward-travel speeds. During this type of inward travel, the damping forces of the two pistons 11, 25 are superimposed on each other. The transfer spring 41, 45 and the return spring 47 do not have to be coordinated with each other in such a way that the two pistons 11, 25 are displaced by exactly the same amount. The damping force that the second piston 25 produces is proportional to the speed at which the second piston 25 travels.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A vibration damper with a hydraulic-mechanical pressure stop, the vibration damper comprising:
   a cylinder filled with a damping medium;
   a piston rod movable in and out of the cylinder;
   a first piston fixed to the piston rod with freedom of axial movement, the first piston dividing the cylinder into a first and a second working space, the piston rod extending through the first working space;
   a second piston spaced from the first piston, the second piston separating the second working space from a third working space;
   a transfer spring in the second working space for moving the second piston toward the third working space in response to movement of the first piston toward the second working space; and
   a disk valve for allowing damping medium to flow from the third working space through the second piston to the second working space as the second piston moves toward the third working space.

2. The vibration damper of claim 1 further comprising a compensating space, a separating piston and a return spring supported by the separating piston, the separating piston separating the third working space from the compensating space.

3. The vibration damper of claim 2, wherein the elastic force of the transfer spring is greater than the elastic force of the return spring at least when the piston rod is displaced a predetermined distance after starting to transmit force to the second piston.

4. The vibration damper of claim 2, wherein the separating piston comprises a tensile force locking device fixed to the return spring so that the end of the return spring facing the separating piston always moves synchronously with the separating piston.

5. The vibration damper of claim 4, wherein the tensile force locking device comprises a mushroom-shaped part on the surface of the separating piston, the mushroom shaped part securing the return spring.

6. The vibration damper of claim 1, wherein the transfer spring is connected to the second piston regardless how far the second piston moves.

7. The vibration damper of claim 1, wherein the transfer spring is an elastomeric body.

8. The vibration damper of claim 1, wherein the second piston comprises a guide sleeve which radially positions the transfer spring.

9. The vibration damper of claim 1, the second piston comprises a check valve which opens toward the third working space.

10. The vibration damper of claim 9 further comprising a fastening device for fastening the disk valve and the check valve to the second piston, the fastening device comprising means for securing the return spring to the second piston.

11. The vibration damper of claim 1 further comprising a support plate associated with a disk valve, the support plate for supporting the transfer spring.

12. The vibration damper of claim 11, wherein the first piston comprises a plurality of valves and wherein the support plate comprises a flow-through opening for a non-throttling connection between the second working space and the plural valves.

13. The vibration damper of claim 1, wherein the transfer spring is a helical compression spring.

* * * * *